(12) United States Patent
Osako et al.

(10) Patent No.: US 9,534,132 B2
(45) Date of Patent: Jan. 3, 2017

(54) HYDROPHILIC SURFACE TREATMENT AGENT FOR ALUMINUM-CONTAINING METAL HEAT EXCHANGERS HAVING EXCELLENT DRAINAGE

(71) Applicant: Nihon Parkerizing Co., Ltd., Tokyo (JP)

(72) Inventors: Tomohiro Osako, Tokyo (JP); Hyonsoo Ahn, Tokyo (JP); Takaomi Nakayama, Tokyo (JP)

(73) Assignee: Nihon Parkerizing Co., Ltd., Tokyo (JP)

( * ) Notice: Subject to any disclaimer, the term of this patent is extended or adjusted under 35 U.S.C. 154(b) by 0 days.

(21) Appl. No.: 14/418,646

(22) PCT Filed: Mar. 21, 2013

(86) PCT No.: PCT/JP2013/058015
§ 371 (c)(1),
(2) Date: Jan. 30, 2015

(87) PCT Pub. No.: WO2014/147782
PCT Pub. Date: Sep. 25, 2014

(65) Prior Publication Data
US 2015/0232681 A1    Aug. 20, 2015

(51) Int. Cl.
| | | |
|---|---|---|
| C08K 3/36 | (2006.01) |
| C08K 5/5419 | (2006.01) |
| C09D 129/04 | (2006.01) |
| F28F 19/02 | (2006.01) |
| C08K 5/544 | (2006.01) |
| C09D 133/26 | (2006.01) |
| C09D 133/02 | (2006.01) |

(52) U.S. Cl.
CPC ............. C09D 129/04 (2013.01); C08K 5/544 (2013.01); C08K 5/5419 (2013.01); C09D 133/02 (2013.01); C09D 133/26 (2013.01); F28F 19/02 (2013.01)

(58) Field of Classification Search
CPC ... C09D 129/04; C09D 133/02; C09D 133/26; F28F 19/02; C08K 5/544; C08K 5/5419
USPC .......................... 524/261, 262, 264, 491, 492
See application file for complete search history.

(56) References Cited

U.S. PATENT DOCUMENTS

| | | | | | |
|---|---|---|---|---|---|
| 4,478,909 | A | * | 10/1984 | Taniguchi | B29D 11/00865 428/331 |
| 5,075,133 | A | * | 12/1991 | Hosono | C09D 129/04 427/162 |
| 5,813,452 | A | | 9/1998 | Haruta et al. | |
| 6,248,181 | B1 | | 6/2001 | Osako et al. | |
| 2002/0042467 | A1 | | 4/2002 | Matsukawa et al. | |
| 2009/0030150 | A1 | | 1/2009 | Lu et al. | |
| 2011/0108262 | A1 | | 5/2011 | Yamasaki et al. | |
| 2011/0274939 | A1 | * | 11/2011 | Kataoka | C08F 261/04 428/463 |

FOREIGN PATENT DOCUMENTS

| | | | |
|---|---|---|---|
| CN | 101679807 | A | 3/2010 |
| EP | 1153990 | A2 | 11/2001 |
| EP | 1245654 | A1 | 10/2002 |
| JP | 63057673 | A * | 3/1988 |
| JP | 01-223188 | A | 9/1989 |
| JP | H05-202313 | A | 8/1993 |
| JP | 06-093209 | A | 4/1994 |
| JP | 06-228459 | A | 8/1994 |
| JP | 06-264001 | A | 9/1994 |
| JP | 07-233270 | A | 9/1995 |
| JP | 08-291269 | A | 11/1996 |
| JP | 09-296121 | A | 11/1997 |
| JP | 10-030069 | A | 2/1998 |
| JP | 11-343450 | A | 12/1999 |
| JP | 2001-172547 | A | 6/2001 |
| JP | 2001-247822 | A | 9/2001 |
| JP | 2001-323250 | A | 11/2001 |
| JP | 2005-162533 | A | 6/2005 |
| JP | 2005-336394 | A | 12/2005 |
| JP | 2009-079889 | A * | 4/2009 |
| WO | 2009/044912 | A1 | 4/2009 |
| WO | 2009119690 | A1 | 10/2009 |

OTHER PUBLICATIONS

Patent Examination Report No. 1 (Office Action) issued Feb. 27, 2015, by the Australian Intellectual Property Office in corresponding Australian Patent Application No. 2013382832 (3 pages).
International Search Report issued in PCT/JP2013/058015 mailed on Jun. 11, 2013 (4 pages).
Notification of Reasons for Refusal (Official Action) issued Dec. 3, 2013, by the Japan Patent Office in corresponding Japanese Patent Application No. JP 2013-547425, with English translation and Verification of Translation (10 pages).

(Continued)

*Primary Examiner* — Alexa Neckel
*Assistant Examiner* — Marie Reddick
(74) *Attorney, Agent, or Firm* — Osha Liang LLP

(57) ABSTRACT

A hydrophilic surface treatment agent for an aluminum-containing metallic heat exchanger, which is obtained by mixing: a water-soluble resin (A) having at least one or more functional groups of an amide group, a hydroxyl group, and a carboxyl group, or a water-soluble resin (A) including, in a skeleton thereof, an amide linkage; colloidal silica (B); organo alkoxy silane and/or a hydrolysate thereof (C); a cross-linking agent (D) capable of forming cross-linkage with the water-soluble resin (A); and water (E), wherein the ratio $\{(B)+(C)\}/\{(A)+(B)+(C)+(D)\}$ is 0.1 to 0.5 in terms of solid content ratio (mass ratio), and the ratio (C)/(B) is 0.5 to 4.0 in terms of solid content ratio (mass ratio).

13 Claims, 1 Drawing Sheet

(56) References Cited

OTHER PUBLICATIONS

PCT International Preliminary Report on Patentability issued Sep. 22, 2015, by The International Bureau of WIPO, in related International Application No. PCT/JP2013/058015 (1 page).
PCT Written Opinion of The International Searching Authority mailed Jun. 11, 2013, in related International Application No. PCT/JP2013/058015 (5 pages).
First Office Action issued Aug. 11, 2015, by the State Intellectual Property Office of the People's Republic of China in corresponding Chinese Patent Application No. CN-201380033594.X, with English machine-translation (14 pages).
Extended European Search Report issued in corresponding European Application No. 13879100.9 dated Oct. 10, 2016 (9 pages).

* cited by examiner

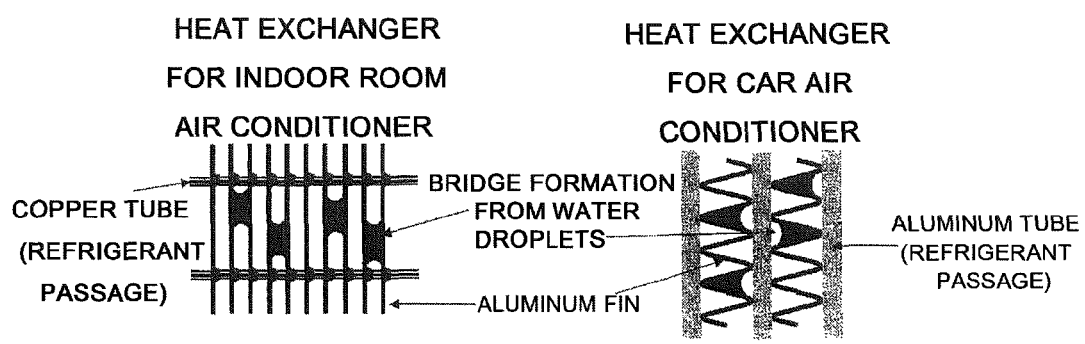

HYDROPHILIC SURFACE TREATMENT AGENT FOR ALUMINUM-CONTAINING METAL HEAT EXCHANGERS HAVING EXCELLENT DRAINAGE

CROSS REFERENCE TO RELATED APPLICATIONS

This is a national stage application based on PCT/JP2013/058015, filed on Mar. 21, 2013. This application claims the benefit and priority of this prior application and incorporates its disclosure by reference in its entirety.

TECHNICAL FIELD

The present invention relates to a hydrophilic surface treatment agent for an aluminum-containing metallic heat exchanger (hereinafter, simply referred to collectively as a heat exchanger) which has excellent drainage performance of dew condensation water, a hydrophilic surface treatment method, and a heat exchanger subjected to a hydrophilic surface treatment.

BACKGROUND ART

In recent years, many of aluminum-containing metallic heat exchangers are, in order to improve the heat dissipation effects or cooling effects of the exchangers, designed so that the area of the heat dissipation section and cooling section is large as much as possible, and for this reason, the fin spacing is extremely reduced. In addition, in order to reduce the ventilation resistance as much as possible, notches referred to as louvers are put between fins in some cases. For this reason, when the exchangers are used as coolers, moisture in the atmosphere is condensed on the surfaces of the heat exchangers, in particular, between the fins, and the condensed water is more likely to become water droplets as the fin surfaces are more hydrophobic, and causes clogging in fin gaps to cause a problem of increasing ventilation resistance, thereby decreasing heat exchanger effectiveness.

Furthermore, the water droplets condensed between the fins induce corrosion of the aluminum forming the fins to deposit an aluminum oxide in white powder form on the fin surface, and makes bacteria, etc. more likely to grow on the surfaces when the surfaces of the heat exchangers left for a long period of time while remaining wet. The white powder of aluminum oxide deposited on the fins and the water droplets retained in the fin gaps fly in a room through blowers of the heat exchangers to provide a feeling of discomfort to users.

In order to prevent the clogging from being caused by the water droplets, treatment methods of providing fin surfaces with hydrophilicity to improve water wettability have been developed. In this case, for the fin surfaces, anticorrosion films (for example, chromate phosphate films, chromate films by chromic acid, or non-chromate films) are first formed on the heat exchangers. Then, on the anticorrosion films, hydrophilic inorganic compounds such as water glass and colloidal silica, as well as organic compounds such as surfactants and water-soluble resins are used singly or in combination to form hydrophilic films. It is to be noted that hydrophilic films may be directly formed without forming the anticorrosion films in some cases.

For example, JP H9-296121 A discloses a hydrophilic treatment agent for metal materials, which contains a water-soluble polymer having an acetal structure and a hydrophilic polymer having at least one or more hydrophilic groups.

JP H11-343450 A discloses a composition for hydrophilic treatment, which contains a water-soluble polymer, a trivalent chromium compound, a zirconium or titanium compound.

However, the hydrophilic films are not always considered to have excellent drainage performance, but the development of hydrophilic films which have further excellent drainage performance has been desired. Moreover, the development of hydrophilic films which stably provide favorable drainage performance for a long period of time has been desired, because the hydrophilic films undergo a significant decrease in drainage performance after use with time.

Furthermore, WO 2009/044912 A discloses a hydrophilic coating agent containing a colloidal silica sol (A), an acrylic polymer (B), a reactive silane coupling agent (C), and a curing agent, characterized in that the mass ratio $\{(A)/(B)\}$ is 5/95 to 95/5, and the ratio $\{(A+B)/(C)\}$ is 30/70 to 95/5.

The hydrophilic films exhibits anti-fog properties because of their high hydrophilicity, hardness, durability, but fail to provide adequate drainage performance.

JP 2005-162533 A discloses a method for producing modified colloidal silica, which is characterized in that colloidal silica obtained by hydrolysis and condensation of a hydrolyzable silicon compound is modified with a modifying agent.

The production method is aimed at modifying the colloidal silica for the improvement of dispersion stability for a long period of time. However, in this method, when the mass ratio of a silane coupling agent exceeds 0.03 with respect to the colloidal silica, problems are caused such as increased secondary particle size, formation of aggregates, and gelation, and even if this silica is used for a hydrophilic surface treatment agent, the amount of the silane coupling agent (it is to be noted that organo alkoxy silane is a type of silane coupling agent) with respect to the colloidal silica does not correspond to adequate surface modification, which is insufficient for providing drainage performance.

JP H7-233270 A discloses an agricultural film which is excellent in antifog properties, which is characterized in that the film is obtained by the emulsion polymerization of an acrylic monomer, a polymerizable silane coupling agent, and colloidal silica, and provided with a coating layer containing 20 weight % to 70 weight % of colloidal silica per total solid content.

The method mentioned above can provide the film surface with permanent hydrophilicity and water droplet flowability, while maintaining excellent transparency and durability at the surface of the agricultural film for use in vinyl greenhouses for agriculture, etc. However, also in this method, the ratio by weight of the silane coupling agent with respect to the colloidal silica is 0.5 at a maximum, which means that the surface modification with the silane coupling agent is insufficient. In the method, the silane coupling agent is used which has a hydrophobic group in the molecule, and the silica surface will be covered with the hydrophobic coupling agent when the agent is contained at 0.5 or more in terms of ratio by weight, and the hydrophilicity of the silica will be thus lost to cause a problem of failure to obtain hydrophilicity at the surface of the coating film. Therefore, in the case of the agricultural film or the like there is no problem with water droplet flowability, while the method is inadequate for drainage performance of structurally complex aluminum-containing metallic heat exchangers.

JP 2001-323250 A discloses a hydrophilic treatment agent containing silica microparticles and a vinyl alcohol polymer, where the silica microparticles are coated with the vinyl alcohol polymer, and dispersed in an aqueous medium in the state of coated particles of 5 nm to 1000 nm in average particle size.

The method mentioned above provides a hydrophilic treatment method for heat exchangers, which is excellent in maintenance of hydrophilicity and deodorant properties. However, even when the silica microparticles are coated with the vinyl alcohol polymer, the drainage performance is inferior to that of colloidal silica surface-modified with a silane coupling agent while the silica microparticles are excellent in deodorant properties.

JP H6-93209 A discloses a hydrophilic film forming agent for aluminum exchangers or fin materials thereof, which contains, as its main constituents, an alkali silicate, a low-molecular organic compound having a carbonyl group, an acrylamide copolymer, and a silane coupling agent, with the solid content of the acrylamide copolymer from 25 weight % to 30 weight %.

The method mentioned above provides hydrophilic films which can reduce cement odors and mold odors specific to the alkali silicate, but the films also have inadequate drainage performance.

Patent Literature 1: JP H9-296121 A
Patent Literature 2: JP H11-343450 A
Patent Literature 3: WO 2009/044912 A
Patent Literature 4: JP 2005-162533 A
Patent Literature 5: JP H7-233270 A
Patent Literature 6: JP 2001-323250 A
Patent Literature 7: JP H6-93209 A

SUMMARY OF INVENTION

Technical Problem

The present invention is intended to solve the problems of the prior art. More specifically, the invention is intended to provide a hydrophilic surface treatment agent which can maintain favorable drainage performance, for use in hydrophilic surface treatments for heat exchangers, a hydrophilic surface treatment method therefor, and a heat exchanger subjected to a hydrophilic surface treatment thereby.

Solution to Problem

Now, with regard to drainage performance in the prior art including the other applications mentioned above, it is recognized as a common sense that it is enough to evaluate the static hydrophilicity measured on a sample with a water droplet delivered thereon under a static state. However, the evaluation of the static hydrophilicity is not enough with regard to drainage performance in the application of an aluminum-containing metallic heat exchanger as an object of the present application. More specifically, the movement of water droplets is involved in order to drain dew condensation water from a heat exchanger, and the mere improvement in static hydrophilicity will thus not always lead to sufficient improvement in drainage performance. For this reason, even when the hydrophilicity is improved, the drainage performance may fail to be improved, thereby causing problems such as increased ventilation resistance in some cases. Because the drainage performance is associated with the movement of dew condensation water discharge, it is important to not only evaluate the static hydrophilicity of the dew condensation water, but also evaluate dynamic hydrophilicity.

The inventors have found that this evaluation on the dynamic behavior is important from the perspective of improvement in drainage performance in the application of an aluminum-containing metallic heat exchanger. Further, the inventors has found, as a result of repeated earnest studies through an evaluation method of a slide angle at which a sample is tilted to move a water droplet, that the implementation of a hydrophilic surface treatment with a hydrophilic surface treatment agent containing specific constituents at specific added ratios can solve the problems mentioned above, thereby leading to the achievement of the present invention.

More specifically, a hydrophilic surface treatment agent which has excellent drainage performance of dew condensation water according to the present invention is a hydrophilic surface treatment agent for an aluminum-containing metallic heat exchanger, which is obtained by mixing:

a water-soluble resin (A) having at least one or more functional groups of an amide group, a hydroxyl group, and a carboxyl group, or a water-soluble resin (A) including, in a skeleton thereof, an amide linkage;

colloidal silica (B);

organo alkoxy silane and/or a hydrolysate thereof (C);

a cross-linking agent (D) capable of forming cross-linkage with the water-soluble resin (A); and water (E), and characterized in that the ratio $\{(B)+(C)\}/\{(A)+(B)+(C)+(D)\}$ is 0.1 to 0.5 in terms of solid content ratio (mass ratio), and the ratio (C)/(B) is 0.5 to 4.0 in terms of solid content ratio (mass ratio).

Furthermore, the colloidal silica (B) used more preferably has a particle size in the range of 1 nm to 100 nm, further preferably in the range of 2 nm to 20 nm.

Furthermore, the organo alkoxy silane (C) more preferably contains a glycidyl group.

Furthermore, the hydrophilic surface treatment agent is more preferably used for a hydrophilic surface treatment, with the pH of the agent in the range of 1 to 7.

Further, the water-soluble resin (A) is more preferably polyvinyl alcohol or a copolymerization product thereof. The cross-linking agent (D) used is more preferably a cross-linking agent including at least one functional group selected from the group consisting of a carboxyl group, an aldehyde group, a glycidyl group, a methylol ether group, and an isocyanate group.

Furthermore, the hydrophilic surface treatment agent may contain a metal compound (F) including at least one metal element selected from the group consisting of V, Ti, Zr, and Cr for improving corrosion resistance.

BRIEF DESCRIPTION OF DRAWINGS

FIG. 1 is a diagram illustrating an example of a heat exchanger to which the present invention is applied.

DESCRIPTION OF EMBODIMENTS

Embodiments of the present invention will be described below. It is to be noted that the term "to" indicating a range in this specification and the claims encompasses both the upper limit and the lower limit, unless otherwise specified. For example, the range "X to Y" means X or more and Y or less, unless otherwise specified.

<<Description of Heat Exchanger>>

Aluminum-containing metals for use as materials for the heat exchanger according to the present invention include aluminum, as well as aluminum alloys, for example, aluminum-magnesium alloys, aluminum-silicon alloys, and aluminum-manganese alloys. Further, the materials are formed into tubes, fins, and hollow plates for use in heat exchangers such as air conditioners. Examples of heat exchangers formed from the parts include a heat exchanger for an automotive air conditioner, which is formed from an aluminum-containing metal along with fins and tubes through which a refrigerant passes, and a heat exchanger for a domestic air conditioner, which is obtained by combining a worked aluminum sheet with a copper pipe, and expanding the pipe to join fins and the pipe. The heat exchangers herein to which the present invention is applied have a structure well known to one skilled in the art, and FIG. 1 shows an example of the well known structure. More specifically, the heat exchanger shown in FIG. 1 is referred to as a so-called fin tube-type heat exchanger. Further, as shown in the figure, this type of heat exchanger may have a bridge of water droplets formed between the fins in some cases. Now, in the case of applying a hydrophilic surface treatment to such a fin tube-type heat exchanger, generally, an aluminum sheet is first subjected to a hydrophilic surface treatment (referred to as precoat) in the case of a room air conditioner. The sheet is formed into the shape of the heat exchanger in FIG. 1. Alternatively, generally, an aluminum sheet is first formed into the shape of the heat exchanger in FIG. 1 in the case of a car air conditioner. This heat exchanger is subjected to a hydrophilic surface treatment (referred to as postcoat). However, these structures and treatment methods are just by way of example only but not to be intended to limit the present invention.

<<Description of Base Film>>

The application of the hydrophilic surface treatment agent to the surface of an aluminum-containing metal substrate provides favorable performance. However, in order to improve corrosion resistance, the surface may be coated with an undercoat chemical conversion layer as a base for a hydrophilic surface treatment film. This undercoat chemical conversion layer is formed by applying chemical conversion treatment to the surface of the aluminum-containing metal substrate, for example, from a chemical conversion treatment agent containing at least one metal element selected from the group consisting of chromium, zirconium, titanium, and vanadium. The undercoat chemical conversion layer is preferably formed to have an application amount of 2 mg/m$^2$ to 500 mg/m$^2$ or a thickness of 0.002 μm to 0.5 μm. On the other hand, while the treatment for base film formation can be considered to be preferably skipped from the perspective of manufacturing process simplification, cost reduction, etc., the present invention can achieve sufficiently satisfactory drainage performance even in the absence of the base film.

<<Description of Hydrophilic Surface Treatment Agent>>

The hydrophilic surface treatment agent is a hydrophilic surface treatment agent for an aluminum-containing metallic heat exchanger, which is obtained by mixing:

a water-soluble resin (A) having at least one or more functional groups of an amide group, a hydroxyl group, and a carboxyl group, or a water-soluble resin (A) including, in a skeleton thereof, an amide linkage;

colloidal silica (B);

organo alkoxy silane and/or a hydrolysate thereof (C);

a cross-linking agent (D) capable of forming cross-linkage with the water-soluble resin (A); and water (E), and characterized in that the ratio {(B)+(C)}/{(A)+(B)+(C)+(D)} is 0.1 to 0.5 in terms of solid content ratio (mass ratio), and the ratio (C)/(B) is 0.5 to 4.0 in terms of solid content ratio (mass ratio).

{Constituent: Water-Soluble Resin (A)}

Examples of the water-soluble resin (A) having at least one or more functional groups of an amide group, a hydroxyl group, and a carboxyl group, or water-soluble resin (A) including, in a skeleton thereof, an amide linkage include, for example, homopolymers and copolymers of acrylamide compounds. The copolymers include copolymers of one or more acrylamide monomers with one or more other comonomers. The comonomers for use herein are selected from anionic, non-ionic, and cationic addition polymerization monomers which are polymerizable with acrylamides, and can be selected from, for example, anionic unsaturated monomers such as (meth)acrylic acid, itaconic acid, maleic acid, vinyl sulfonic acid, styrene sulfonic acid, sulfoethylacrylate, sulfoethylmethacrylate, N-methylene sulfonic acid acrylamide, 2-acrylamide-2-methylpropanesulfonic acid, and acid phosphoxyethyl methacrylate, or salts thereof; non-ionic unsaturated monomers such as (meth)acrylamide, N-methylol (meth)acrylamide, hydroxyethyl (meth)acrylate, vinylpyrrolidone, acryloylmorpholine, polyethylene glycol acrylate, and polyethylene glycol acrylate alkyl phenyl ether; as well as cationic unsaturated monomers such as aminoethyl (meth)acrylate, N,N-dimethylaminoethyl acrylate, N-hydroxypropylaminoethyl (meth)acrylate, hydroxymethylaminoethyl methacrylate, vinylimidazole, vinylpyridine, N,N-diallylamine, and N,N-diallyl-N,N-dimethylammmonium chloride.

Furthermore, examples of the water-soluble resin (A) also include polyvinyl alcohols including a hydroxyl group or derivatives thereof, and polyacrylic acids including a carboxyl group or derivative thereof.

Examples of the water-soluble resin (A) including, in a skeleton thereof, an amide linkage include, for example, water-soluble polyamides and water-soluble nylons. The water-soluble polyamides include basic polyamides obtained from polyalkylene polyamines and aliphatic dicarboxylic acids, for example, adipic acid, and epoxy-modified polyamides produced by reacting the basic polyamides with epichlorohydrin. The water-soluble nylons include, for example, cationic nylons containing an amino group, and non-ionic nylons containing an ethylene oxide.

Among those, the water-soluble resin (A) is preferably a polyvinyl alcohol or a derivative thereof. More specifically, examples thereof include partial saponification products and complete saponification products of polyvinyl acetate, as well as partial saponification products and complete saponification products of copolymers of vinyl acetate with other monomer, and modified products of polyvinyl alcohol. The comonomer for copolymerization with vinyl acetate is not particularly limited, but for example, acrylic acid, methacrylic acid, itaconic acid, and maleic acid, or salts thereof can be used as anionic comonomers, styrene, acrylonitrile, vinyl ether, (meth)acrylamide, N-methylol (meth)acrylamide, methyl (meth)acrylate, hydroxyethyl (meth)acrylate, vinylpyrrolidone, and acryloylmorpholine can be used as non-ionic comonomers, and aminoethyl (meth)acrylate, N-hydroxypropylaminoethyl (meth)acrylate, vinylimidazole, and N,N-dimethyldiallylamine can be used as cationic comonomers.

The polyvinyl alcohol or derivative thereof has a weight average molecular weight of 5,000 to 200,000, more preferably 10,000 to 100,000, and further preferably 20,000 to 50,000. The weight average molecular weight less than 5000 fails to form an adequate network structure in the film to fail to exhibit durability, whereas the molecular weight in excess of 200,000 increases the viscosity to make colloidal silica in the hydrophilic film unlikely to be uniformly dispersed in the film, thereby decreasing the drainage performance. The weight average molecular weight herein refers to the weight average molecular weight measured by a GPC-LALLS method. The measurement method will be mentioned below.
1) GPC
Device: Gel Permeation Chromatograph Type 244 from Waters
Column: TSK-gel-GMPW from Tosoh Corporation (Inside Diameter: 8 mm, Length: 30 cm, 2 lines)
Solvent: 0.1 M-Tris Buffer (pH 7.9)
Flow Rate: 0.5 ml/min
Temperature: 23° C.
Sample Concentration: 0.040%
Filtration: 0.45 µm MY SHORI DISK (in Katakana) W-25-5 from
Tosoh Corporation
Injection Volume: 0.2 ml
Detection Sensitivity (differential refractive index detector): 4 times
2) LALLS
Device: Low-Angle Laser Light Scattering Photometer Type KMX-6 from Chromatrix
Temperature: 23° C.
Wavelength: 633 nm
Second Virial Coefficient×Concentration: 0 mol/g
Change in Diffraction Index with Concentration (dn/dc): 0.159 ml/g
Filter: 0.45 µm filter HAWP 01300 from MILLIPORE
Gain: 800 mV It is to be noted that the polyvinyl alcohol or derivative thereof for use in the water-soluble resin (A) preferably has a saponification degree of 95 mol % or more, preferably 98 mol % or more. When a large number of acetyl groups due to a low saponification degree is bonded, the solubility in water is decreased. In addition, the large number of acetyl groups fails to adequately develop the reaction with the cross-linking agent to decrease the degree of cross-linkage, thus deteriorating the durability to decrease the drainage performance after endurance. The saponification degree herein refers to the value measured in accordance with the JIS-K-6726: testing methods for polyvinyl alcohol.
{Constituent: Colloidal Silica (B)}

The colloidal silica (B) used is a dispersion of a silicate compound containing silicon and oxygen as main constituents, but the type thereof is not particularly limited. Generally, colloidal silica is used which is obtained by a method such as the removal of sodium, potassium, or lithium from an alkali silicate such as sodium silicate, potassium silicate, or lithium silicate for solation in accordance with an ion exchange method. Furthermore, colloidal silica can be also used which is obtained by dispersing, in water, particulate silica referred to as fumed silica.

The colloidal silica (B) preferably has an average particle size in the range of 1 nm to 100 nm, more preferably, in the range of 2 nm to 20 nm. For drainage performance of dew condensation water, moderate surface asperity of the hydrophilic film is effective, excessively small particle sizes result in failure to adequately produce the effect of the colloidal silica, whereas excessively large sizes make the colloidal silica originally immobilized and retained on the hydrophilic film more likely to flow off after endurance, thereby making it possible to retain the silica. The average particle size of the colloidal silica is a number average particle size, which is measured by a nitrogen adsorption method.

{Constituent: Organo Alkoxy Silane (C) and/or Hydrolysate (C) Therefrom}

Examples of the organo alkoxy silane (C) used include, for example, phenylmethoxysilane, diphenylethoxysilane, phenyltrimethoxysilane, phenyltriethoxysilane, β-(3,4-epoxycyclohexyl)ethyltrimethoxysilane, γ-glycidoxypropylmethyldiethoxysilane, γ-glycidoxypropyltriethoxysilane, N-β(aminoethyl)γ-aminopropyltrimethoxysilane, γ-aminopropyltriethoxysilane, γ-methacryloxypropylmethyldiethoxysilane, γ-mercaptopropylmethyldimethoxysilane, p-styryltrimethoxysilane, γ-acryloxypropyltrimethoxysilane, N-phenyl-γ-aminopropyltrimethoxysilane, γ-ureide propyltriethoxysilane, γ-chloropropyltrimethoxysilane, bis(triethoxysilylpropyl)tetrasulfide, γ-isocyanatepropyltriethoxysilane, γ-triethoxysilyl-N-(1,3-dimethylbutylidene) propylamine, and N-(vinylbenzylamine)-β-aminoethyl-γ-aminopropyltrimethoxysi lane.

Above all, the organo alkoxy silane (C) preferably contains a glycidyl group. Having the glycidyl group makes it possible to bind to the water-soluble resin (A) tightly to improve the durability in actual use environments, and maintain and exert favorable drainage performance even after endurance. In addition, it is believed that silanol groups of the organo alkoxy silane (C) bind to silanol groups of the colloidal silica (B) to modify the surface of the colloidal silica, thereby forming a surface that has better drainage performance of dew condensation water.

{Constituent: Cross-Linking Agent (D) Capable of Cross-Linking with Water-Soluble Resin (A)}

The cross-linking agent (D) used is not particularly limited, as long as the agent is capable of forming cross-linkage with the water-soluble resin (A), but preferably a water-soluble cross-linking agent including at least one functional group selected from the group consisting of a carboxyl group, an aldehyde group, a glycidyl group, a methylol ether group, and an isocyanate group. The cross-linking agent can be selected from among methylol melamine, methylolurea, methylolated polyacrylamide, polyethylene glycol diglycidyl ether, glyoxal, butanetetracarboxylic acid, etc. Above all, the cross-linking agents containing a carboxyl group, in particular, cross-linking agents containing two or more carboxyl groups in one molecule are more preferred because the agents exhibit high degrees of cross-linkage.

{Constituent: Water (E)}

The constituent (E) contains water as its main constituent (for example, 80 volume % or more, 90 volume % or more, or 95 volume % or more with the total volume of the solvent as a reference). It is to be noted that while water is typically used, a water-miscible solvent, such as alcohol, may be added.

{Constituent: Metal Compound (F)}

In order to improve the corrosion resistance, the hydrophilic surface treatment agent may contain a metal compound (F) including at least one metal element selected from the group consisting of V, Ti, Zr, and Cr. The compounds including Cr include, for example, trivalent chromium compounds, such as chromium sulfate, chromium nitrate, chromium biphosphate, chromium fluoride, chromium acetate, and chromium formate. The trivalent chromium compounds also include reduced products of chromic acid compounds, such as chromic acid anhydride and dichromic acid. The zirconium compounds include, for example, zirconium compounds such as zirconium nitrate, zirconium oxynitrate, zirconyl acetate, zirconyl sulfate, zirconyl ammonium carbonate, zirconyl potassium carbonate, zirconyl sodium carbonate, zirconia sol, and fluorozirconic acid or salts thereof. Furthermore, the compounds also include zirconic acid and salts thereof, which are manufactured by applying ion exchange or alkali neutralization to aqueous solutions of water-soluble zirconium salts. The titanium compounds can be selected from among, for example, titanyl sulfate, titanyl nitrate, titanium nitrate, titanyl chloride, titania sol, titanium oxide, potassium titanium oxalate, titanium lactate, titanium tetraisopropoxide, titanium acetylacetonate, diisopropyl titanium bisacetylacetone, and fluorotitanic acid or salts thereof. Furthermore, the compounds also include a metatitanic acid obtained by applying thermal hydrolysis to an aqueous solution of titanyl sulfate, an orthotitanic acid obtained by alkali neutralization, and salts of these acids. The vanadium compounds include, for example, vanadium pentoxide, ammonium metavanadate, sodium metavanadate, vanadium oxytrichloride, vanadium trioxide, vanadium dioxide, vanadium oxysulfate, vanadium oxyacetylacetonate, vanadium acetylacetonate, vanadyl acetylacetonate, vanadium trichloride, phosphovanadomolybdic acid, and vanadium sulfate. The metal compound forms metal cross-linkage with the water-soluble resin (A) to increase the crosslink density of the hydrophilic film and improve the corrosion resistance. This makes it possible to exhibit favorable corrosion resistance even in the absence of the base film, and maintain excellent drainage performance after endurance.

{Constituent: Other Constituents}

In addition, the generation of foul odors by reproduction of molds, bacterium, and yeasts can be prevented by adding an antibacterial agent and/or an anti-mold agent to the aqueous treatment agent according to the present invention, as long as the effect of the aqueous treatment agent is not impaired. The antibacterial and anti-mold agents which can be used in the present invention are desirably antibacterial and anti-mold agents that can withstand heating in the removal of water as a solvent of the aqueous treatment agent in a drying step after applying the aqueous treatment agent according to the present invention, that is, have no decomposition point at temperatures up to 100° C. The antibacterial and anti-mold agents contained in the aqueous hydrophilic surface treatment agent according to the present invention can be selected from among, for example, 5-chloro-2-methyl-4-isothiazoline-3-one, 2-methyl-4-isothiazoline-3-one, 2-(4-thiocyanomethylthio)benzothiazole, 2,2-dibromo-3-nitrilopropionamide, sodium ethylenebis(dithiocarbamate), sodium-2-pyridinethiol-1-oxide, zinc-2-pyridinethiol-1-oxide, 2,2'-dithiobis(pyridine-1-oxide), 2,4,5,6-tetrachloroisophthalonitrile, 2-methylcarbonyl aminobenzimidazole, 2,3,5,6-tetrachloro-4-(methylsulfonyl)-pyridine, 2-(4-thiazolyl)-benzimidazole, N-(fluorodichloromethylthio)sulfamide, p-chloro-m-xylenol, dehydroacetic acid, o-phenylphenol, 1,2-benzisothiazolin-3-one, 2-bromo-2-nitropropane-1,3-diol, barium metaborate, diiodomethyl-p-toluene sulfone, 2-n-octyl-4-isothiazoline-3-one, 10,10'-oxybisphenoxarsine, and 1,2-dibromo-2,4-dicyanobutane.

In addition, the hydrophilic surface treatment agent may include surfactants and pigments for processability improvement and coloring.

{Added Amount: (A) to (D)}

The solid content ratio (mass ratio) of the (B)+(C) mentioned above to the sum total, {(B)+(C)}/{(A)+(B)+(C)+(D)} is 0.1 to 0.5. Furthermore, the ratio is more preferably 0.2 to 0.5. The ratio {(B)+(C)}/{(A)+(B)+(C)+(D)} in excess of 0.5 results in failure to achieve adequate immobilization in the film, then in flowing off. Alternatively, the {(B)+(C)}/{(A)+(B)+(C)+(D)} below 0.1 results in both inadequate hydrophilicity and drainage performance.

The ratio (mass ratio) (C)/(B) of the colloidal silica (B) and the organo alkoxy silane (C) is 0.5 (preferably in excess of 0.5) to 4.0. Furthermore, the ratio is more preferably 1.0 to 3.0. The ratio (C)/(B) below 0.5 results in failure to achieve adequate surface modification for the colloidal silica, whereas the ratio (C)/(B) in excess of 4.0 makes the moderate surface asperity of the hydrophilic film inadequate.

In the addition of the constituents (B) and (C) to the hydrophilic surface treatment agent, the constituents (B) and (C) may be put in another container in advance, and subjected to pretreatment such as heating and stirring. The heating is preferably 30° C. to 80° C. in order to efficiently promote hydrolysis.

{Added Amount of Metal Compound (F)}

The hydrophilic surface treatment agent containing the metal compound leads to the achievement of favorable corrosion resistance without applying the base film. While the added amount is not particularly limited, the added ratio of the solid content of the metal compound is 0.1 mass % to 50 mass %, preferably 1 mass % to 30 mass %, and further preferably 10 mass % to 20 mass %, when the solid content of raw materials combined in the hydrophilic surface treatment agent is regarded as 100. When the added amount of the metal compound is decreased, the deterioration of corrosion resistance makes corrosion likely to be caused to deteriorate the drainage performance after endurance. Alternatively, when the added amount is excessively increased, insufficiently achieved dispersion of the colloidal silica to the outermost surface decreases the drainage performance.

{Added Amount of Other Constituents}

The other constituents may be appropriately added thereto in appropriate amounts, as needed. For example, the added ratio of the solid content of the antibacterial and anti-mold agents is preferably 0.1 mass % to 10 mass %, more preferably 0.1 mass % to 5 mass %, when the solid content of raw materials added to the hydrophilic surface treatment agent is regarded as 100.

<<Description of How to Use Hydrophilic Surface Treatment Agent>>

As the application method, various types of application methods can be used, such as dipping, roll coating, spin coating, and bar coating, and above all, the dipping method is preferred.

With the pH of the hydrophilic surface treatment agent in the range of preferably 1 to 7, more preferably 1 to 4, the agent is used for hydrophilic surface treatments. The pH in excess of 7 may decrease the stability of the constituents in some cases. The pH herein refers to the value measured with a pH measurement instrument: pH meter MM-60R from DKK-TOA CORPORATION.

The applied hydrophilic surface treatment agent is heated preferably at 100° C. to 180° C., more preferably at 120° C. to 160° C. to form a hydrophilic film.

[Operation]

The hydrophilic surface treatment agent for aluminum-containing metallic heat exchangers, which is provided by the present invention, is excellent in odor suppression, and in corrosion resistance. Furthermore, it can maintain favorable drainage performance of dew condensation water over a long period of time. The mechanism for the hydrophilic surface treatment agent according to the present invention to maintain favorable drainage performance of dew condensation water is understood as follows. Hydrophilic films formed from the hydrophilic surface treatment agent show favorable hydrophilicity, and besides, uppermost surface asperity provided by the colloidal silica serves to enhance the hydrophilicity. Furthermore, the colloidal silica is believed to also serve to improve the drainage performance (dynamic hydrophilicity), because the surface of the colloidal silica is modified with the organo alkoxysilane. The reason why the dynamic hydrophilicity is improved has not been clarified. However, in the evaluation of the dynamic hydrophilicity, contact angle hysteresis is discussed as the difference between the contact angle at the anterior end of a slipping water droplet (advancing contact angle) and the contact angle at the posterior end of the water droplet (receding contact angle). As this difference is smaller between the advancing contact angle and the receding contact angle, that is, the contact angle hysteresis is smaller, a surface is provided which is better in dynamic hydrophilicity. Through the addition of the colloidal silica modified with the organo alkoxy silane, some factor such as chemical inhomogeneity, the molecular arrangement at the solid-liquid interface, and the three-dimensional geometry of the surface is believed to reduce the contact angle hysteresis.

In addition, among the organo alkoxy silanes, the modification of the colloidal silica with the organo alkoxy silane containing a glycidyl group improves not only the initial drainage performance, but also the drainage performance after endurance under actual use conditions.

EXAMPLES

While the present invention will be further described with reference to the following examples, these examples are each by way of example only, but not to be considered to limit the scope of the present invention in any way.

Aluminum test pieces {Test Piece A1050 from PALTEK} were immersed for 120 seconds in a 20 g/L aqueous solution of an alkali degreasing agent FINECLEANER 315E (from Nihon Parkerizing Co., Ltd.) kept at 60° C. to remove surface contaminants such as oils, and then subjected to water rinsing with tap water for 15 seconds. The test pieces were immersed for 120 seconds in an aqueous solution with hexavalent chromium-free chemical conversion treatment agents PALCOAT 3700 A and B by 40 g/L each added thereto and 1.5 g/L of neutralizer NT-4058 added thereto, which was kept at 50° C., to form base films thereon, and used as test samples. These samples were not dried, but treated with the hydrophilic treatment agent, and used as evaluation samples.

Tables 1 to 5 show raw materials for use in the treatment of hydrophilic surface treatment agents.

TABLE 1

List of Water-Soluble Resin (A)

| No | Name of Resin | Weight Average Molecular Weight | Saponification Degree (mol/%) |
|---|---|---|---|
| A1 | Polyvinyl Alcohol | 50000 | 98% |
| A2 | Polyacrylamide | 30000 | — |
| A3 | Polyacrylic Acid | 60000 | — |
| A4 | Polyvinylpyrrolidone | 100000 | — |

TABLE 2

List of Colloidal Silica (B)

| No | Name of Commercially Available Products | Particle Size (nm) | Manufacturer | Content Rate of Active Constituent |
|---|---|---|---|---|
| B1 | SNOWTEX XS | 4-6 | Nissan Chemical Industries, Ltd. | SiO2: 20% |
| B2 | SNOWTEX OS | 8-11 | Nissan Chemical Industries, Ltd. | SiO2: 20% |

TABLE 2-continued

List of Colloidal Silica (B)

| No | Name of Commercially Available Products | Particle Size (nm) | Manufacturer | Content Rate of Active Constituent |
|---|---|---|---|---|
| B3 | SNOWTEX XL | 40-60 | Nissan Chemical Industries, Ltd. | SiO2: 40% |
| B4 | SNOWTEX ZL | 70-100 | Nissan Chemical Industries, Ltd. | SiO2: 40% |
| B5 | MP-2040 | 200 | Nissan Chemical Industries, Ltd. | SiO2: 40% |

*The range of the particle size represents a fluctuation range for each product lot.
*The content rate is expressed in weight %.

TABLE 3

List of Organo Alkoxy Silane (C)

| No | Name |
|---|---|
| C1 | γ- glycidoxypropyltriethoxysilane |
| C2 | aminopropyltriethoxysilane |
| C3 | vinyltriethoxysilane |
| C4 | tetraethoxysilane |

TABLE 4

List of Cross-Linking Agent (D)

| No | Name |
|---|---|
| D1 | Butanetetracarboxylic Acid |
| D2 | Glyoxal |
| D3 | Methylol Melamine |

TABLE 5

List of Metal Compound (F)

| No | Name |
|---|---|
| F1 | Chromium Sulfate |

The raw materials were mixed in water in accordance with the compositions for each constituent as shown in Tables 6 and 7 to obtain hydrophilic surface treatment agents. It is to be noted that in terms of the added amounts (mass %) of the raw materials in Tables 6 and 7, the added ratios of the solid contents for each raw material are expressed in percentage when the total amounts of the solid contents of the raw materials added to the hydrophilic surface treatment agents are regarded as 100. As a method for preparing the hydrophilic surface treatment agents, first, predetermined colloidal silica and organo alkoxy silane were mixed to prepare a silicon compound dispersion, and water as a solvent, as well as various types of other constituents were then added thereto. It is to be noted that the pH was in the range of 1 to 7 in any of the examples.

These hydrophilic surface treatment agents were used to coat each test sample through immersion treatment, and the samples were then, without being washed with water, directly put in an oven for drying to form hydrophilic surface treatment films. The samples were dried for 10 minutes at a drying temperature of 150° C. in the oven.

TABLE 6

Examples

| | Water-Soluble Resin (A) | | Colloidal Silica (B) | | Organo Alkoxy Silane (C) | | Cross-Linking Agent (D) | | Solid Content Ratio ((B) + (C))/ ((A) + (B) + (C) + (D)) | Ratio (C)/(B) | Metal Compound (F) | | Chemical Conversion Treatment Yes or No |
|---|---|---|---|---|---|---|---|---|---|---|---|---|---|
| | Constituent | Added Amount | Constituent | Added Amount | Constituent | Added Amount | Constituent | Added Amount | | | Constituent | Added Amount | |
| Example 01 | A1 | 50.8 | B1 | 8.6 | C1 | 21.8 | D1 | 18.8 | 0.30 | 2.53 | F1 | 0 | Yes |
| Example 02 | A1 | 67.5 | B1 | 3.4 | C1 | 7.3 | D1 | 21.9 | 0.11 | 2.15 | F1 | 0 | Yes |
| Example 03 | A1 | 51.5 | B1 | 19.1 | C1 | 10.3 | D1 | 19.1 | 0.29 | 0.54 | F1 | 0 | Yes |
| Example 04 | A1 | 54.3 | B1 | 9.2 | C1 | 16.3 | D1 | 20.1 | 0.26 | 1.76 | F1 | 0 | Yes |
| Example 05 | A1 | 45.7 | B1 | 7.8 | C1 | 29.7 | D1 | 16.9 | 0.37 | 3.82 | F1 | 0 | Yes |
| Example 06 | A1 | 69.7 | B1 | 10.5 | C1 | 7.0 | D1 | 12.9 | 0.17 | 0.67 | F1 | 0 | Yes |
| Example 07 | A1 | 68.5 | B1 | 4.1 | C1 | 14.7 | D1 | 12.7 | 0.19 | 3.58 | F1 | 0 | Yes |
| Example 08 | A2 | 61.6 | B1 | 10.3 | C1 | 20.5 | D1 | 7.6 | 0.31 | 2.00 | F1 | 0 | Yes |
| Example 09 | A3 | 67.0 | B1 | 7.6 | C1 | 8.9 | D1 | 16.5 | 0.17 | 1.18 | F1 | 0 | Yes |
| Example 10 | A1 | 63.1 | B2 | 9.5 | C1 | 15.8 | D1 | 11.7 | 0.25 | 1.67 | F1 | 0 | Yes |
| Example 11 | A1 | 40.3 | B3 | 13.7 | C1 | 16.1 | D1 | 29.8 | 0.30 | 1.18 | F1 | 0 | Yes |
| Example 12 | A1 | 50.8 | B4 | 8.6 | C1 | 21.8 | D1 | 18.8 | 0.30 | 2.53 | F1 | 0 | Yes |
| Example 13 | A1 | 54.5 | B1 | 16.3 | C2 | 19.1 | D1 | 10.1 | 0.35 | 1.17 | F1 | 0 | Yes |
| Example 14 | A1 | 50.8 | B1 | 8.6 | C3 | 21.8 | D1 | 18.8 | 0.30 | 2.53 | F1 | 0 | Yes |
| Example 15 | A1 | 66.1 | B1 | 7.5 | C4 | 22.0 | D1 | 4.4 | 0.30 | 2.94 | F1 | 0 | Yes |
| Example 16 | A1 | 50.8 | B1 | 8.6 | C1 | 21.8 | D2 | 18.8 | 0.30 | 2.53 | F1 | 0 | Yes |
| Example 17 | A1 | 59.3 | B1 | 8.9 | C1 | 20.8 | D3 | 11.0 | 0.30 | 2.33 | F1 | 0 | Yes |
| Example 18 | A1 | 50.8 | B1 | 8.6 | C1 | 21.8 | D1 | 18.8 | 0.30 | 2.53 | F1 | 0 | No |
| Example 19 | A1 | 43.7 | B1 | 7.4 | C1 | 18.8 | D1 | 16.2 | 0.30 | 2.53 | F1 | 14.0 | No |
| Example 20 | A1 | 43.7 | B1 | 7.4 | C1 | 18.8 | D1 | 16.2 | 0.30 | 2.53 | F1 | 14.0 | Yes |
| Example 21 | A1 | 64.2 | B5 | 10.7 | C1 | 17.1 | D1 | 7.9 | 0.28 | 1.60 | F1 | 0 | Yes |

TABLE 7

| | Water-Soluble Resin (A) | | Colloidal Silica (B) | | Organo Alkoxy Silane (C) | | Cross-Linking Agent (D) | | Solid Content Ratio ((B) + (C))/ ((A) + (B) + (C) + (D)) | Ratio (C)/(B) | Metal Compound (F) | | Chemical Conversion Treatment Yes or No |
|---|---|---|---|---|---|---|---|---|---|---|---|---|---|
| | Constituent | Added Amount | Constituent | Added Amount | Constituent | Added Amount | Constituent | Added Amount | | | Constituent | Added Amount | |
| Comparative Example 01 | A4 | 50.8 | B1 | 8.6 | C1 | 21.8 | D1 | 18.8 | 0.30 | 2.53 | F1 | 0 | Yes |
| Comparative Example 02 | A1 | 71.2 | B1 | 0.7 | C1 | 1.8 | D1 | 26.3 | 0.02 | 2.50 | F1 | 0 | Yes |
| Comparative Example 03 | A1 | 20.5 | B1 | 20.5 | C1 | 51.3 | D1 | 7.6 | 0.72 | 2.50 | F1 | 0 | Yes |
| Comparative Example 04 | A1 | 57.5 | B1 | 21.3 | C1 | 0.0 | D1 | 21.3 | 0.21 | 0.00 | F1 | 0 | Yes |
| Comparative Example 05 | A1 | 44.6 | B1 | 7.6 | C1 | 31.3 | D1 | 16.5 | 0.39 | 4.12 | F1 | 0 | Yes |
| Comparative Example 06 | A1 | 62.5 | B1 | 10.6 | C1 | 26.9 | D1 | 0.0 | 0.38 | 2.53 | F1 | 0 | Yes |

<Test and Evaluation> The test samples prepared according to Examples 1 to 21 and Comparative Examples 1 to 6 were subjected to tests and evaluations by the following methods.
(1) Contact Angle of Initial Sample (before endurance): onto the samples after the hydrophilic surface treatment, 1 μL of deionized water was delivered by drops, the contact angles of the delivered water droplets were measured with the use of an automatic contact angle meter DM-501 (from Kyowa Interface Science Co., Ltd).
Ranks Results of Contact Angle Measurement

| ⊙ | 0° to 10° |
| ○ | 11° to 20° |
| Δ | 21° to 30° |
| X | 31° or more |

(2) Contact Angle of Sample after Endurance: the contact angles of water droplets on the samples immersed for 72 hours in running water (1 L/min) at room temperature were measured with the contact angle meter mentioned above.
Ranks Results of Contact Angle Measurement

| ⊙ | 0° to 20° |
| ○ | 21° to 40° |
| Δ | 41° to 60° |
| X | 61° or more |

(3) Slide Angle of Initial Sample (before endurance): onto the samples after the hydrophilic treatment, 10 μL, of deionized water was delivered by drops, the samples were inclined to set, as slide angles, the inclination angles of the samples with water droplets 1 mm moved, and the slide angles were measured with the contact angle meter mentioned above. More specifically, the samples are continuously inclined at a speed of 2 degrees/sec (continuous inclination method). The angles at which water droplets are 1 mm moved are automatically read through image analyses conducted by the system. It is to be noted that the contact angle meter was used which was equipped with a unit (DM-SA01) for inclining the samples.
Ranks Results of Slide Angle Measurement

| | |
|---|---|
| ⊙ | 0° to 10° |
| ○ | 11° to 20° |
| Δ | 21° to 30° |
| X | 31° or more |

(4) Slide Angle of Sample after Endurance: the slide angles of water droplets on the samples immersed for 72 hours in running water at room temperature were measured with the contact angle meter mentioned above.
Ranks Results of Slide Angle Measurement

| | |
|---|---|
| ⊙ | 0° to 20° |
| ○ | 21° to 40° |
| Δ | 41° to 60° |
| X | 61° or more |

(5) Corrosion Resistance: the rust areas (the ratios of the white rust areas to the total areas) of fin sections after exposure to a corrosion resistance test for 720 hours in accordance with the salt spray testing specified method JIS Z-2371 were evaluated by visual observation. Here are the evaluation criteria.
Ranks Evaluation Results of Corrosion Resistance

| | |
|---|---|
| ⊙ | white rust area less than 1% |
| ○ | white rust area from 1% to less than 5% |
| Δ | white rust area from 5% to less than 30% |
| X | white rust area of 30% or more |

(6) Water Resistance: the initial film amounts of the samples, and the film amounts of the samples immersed for 72 hours in running water at room temperature were measured to calculate, in percentage, the residual ratios of the film amounts after running water.

Water Resistance (%)=100×Film Amount after Running Water (g/m$^2$)/Initial Film Amount (g/m$^2$)

Ranks Results of Water Resistance Measurement

| | |
|---|---|
| ⊙ | 100% to 85% |
| ○ | 84% to 70% |
| Δ | 69% to 55% |
| X | 54% or less |

Table 8 summarizes the evaluation results of the samples after the hydrophilic surface treatment with the hydrophilic surface treatment agents of the compositions according to Examples 1 to 21 and Comparative Examples 1 to 6.

TABLE 8

| | Contact Angle | | Slide Angle | | Corrosion | Water | Comprehensive |
|---|---|---|---|---|---|---|---|
| | Initial | After Running Water | Initial | After Running Water | Resistance | Resistance (%) | Evaluation |
| Example 01 | ⊙ | ⊙ | ⊙ | ⊙ | ⊙ | ⊙ | ⊙++ |
| Example 02 | ⊙ | ⊙ | ⊙ | ○ | ⊙ | ⊙ | ⊙+ |
| Example 03 | ⊙ | ⊙ | ⊙ | ○ | ⊙ | ⊙ | ⊙+ |
| Example 04 | ⊙ | ⊙ | ⊙ | ⊙ | ⊙ | ⊙ | ⊙++ |
| Example 05 | ⊙ | ⊙ | ⊙ | ○ | ⊙ | ⊙ | ⊙+ |
| Example 06 | ⊙ | ⊙ | ○ | ○ | ⊙ | ⊙ | ⊙ |
| Example 07 | ⊙ | ○ | ○ | ○ | ⊙ | ⊙ | ⊙ |
| Example 08 | ⊙ | ○ | ⊙ | ○ | ⊙ | ⊙ | ⊙+ |
| Example 09 | ⊙ | ⊙ | ○ | ○ | ⊙ | ○ | ⊙ |
| Example 10 | ⊙ | ⊙ | ⊙ | ⊙ | ⊙ | ⊙ | ⊙++ |
| Example 11 | ⊙ | ⊙ | ○ | ○ | ⊙ | ⊙ | ⊙ |
| Example 12 | ⊙ | ⊙ | ○ | ○ | ⊙ | ⊙ | ⊙ |
| Example 13 | ⊙ | ⊙ | ⊙ | ○ | ⊙ | ⊙ | ⊙+ |
| Example 14 | ⊙ | ⊙ | ○ | ○ | ⊙ | ⊙ | ⊙ |
| Example 15 | ⊙ | ⊙ | ○ | ○ | ⊙ | ⊙ | ⊙ |
| Example 16 | ⊙ | ○ | ⊙ | ○ | ⊙ | ⊙ | ⊙+ |
| Example 17 | ⊙ | ○ | ⊙ | ○ | ⊙ | ○ | ⊙ |
| Example 18 | ⊙ | ⊙ | ⊙ | ⊙ | Δ | ○ | ⊙+ |
| Example 19 | ⊙ | ⊙ | ⊙ | ⊙ | ○ | ○ | ⊙+ |
| Example 20 | ⊙ | ⊙ | ⊙ | ⊙ | ⊙ | ○ | ⊙++ |
| Example 21 | ○ | ○ | ○ | Δ | ⊙ | ○ | ○+ |
| Comparative Example 01 | ⊙ | X | ○ | X | ⊙ | X | X |
| Comparative Example 02 | ○ | X | Δ | X | ⊙ | ⊙ | X |
| Comparative Example 03 | ⊙ | ○ | ○ | X | ⊙ | X | X |
| Comparative Example 04 | ○ | ○ | Δ | X | ⊙ | ⊙ | X |
| Comparative Example 05 | ⊙ | Δ | Δ | X | ⊙ | X | X |
| Comparative Example 06 | ⊙ | X | ○ | X | ⊙ | X | X |

TABLE 8-continued

| | Contact Angle | | Slide Angle | | Corrosion | Water | Comprehensive |
|---|---|---|---|---|---|---|---|
| | Initial | After Running Water | Initial | After Running Water | Resistance | Resistance (%) | Evaluation |

※Evaluation Criteria for Each Performance

| Evaluation | Grade (A) |
|---|---|
| ⊚ | 3 |
| ○ | 2 |
| Δ | 1 |
| X | 0 |

※Weighting on Grade for Each Performance

| Performance | Grade Weighting (w) |
|---|---|
| Contact Angle(Initial) | 1 |
| Contact Angle(After Running Water) | 1 |
| Slide Angle (Initial) | 2 |
| Slide Angle (After Running Water) | 2 |
| Corrosion Resistance | 1 |
| Water Resistance | 1 |

※The grade for each performance is multiplied by the weighting to obtain an overall grade.

Overall Grade = ΣwA

※Comprehensive Evaluation Criteria

| Evaluation | Grade |
|---|---|
| ⊚++ | 23-24 |
| ⊚+ | 21-22 |
| ⊚ | 19-20 |
| ○++ | 17-18 |
| ○+ | 15-16 |
| ○ | 13-14 |
| X | ~12 |

As shown in Table 8, the treatment agents according to the present invention, which include the predetermined compounds, and have the appropriately adjusted proportions of water-soluble resin (A), colloidal silica (B), organo alkoxy silane (C), and cross-linking agent (D), exhibit excellent contact angles and slide angles even after endurance, and also exert further favorable corrosion resistance and water resistance.

Above all, Examples 1, 4, and 10 of using polyvinyl alcohol as the water-soluble resin (A), controlling the particle size of the colloidal silica (B) to 2 nm to 20 nm, using an organo alkoxy silane containing a glycidyl group as the organo alkoxy silane (C), adjusting the ratio {(B)+(C)}/{(A)+(B)+(C)+(D)} in the range of 0.2 to 0.5, and adjusting the ratio (C)/(B) to 1.0 to 3.0 have exerted outstanding comprehensive performance. Furthermore, the addition of the metal compound to the hydrophilic surface treatment agents exerts excellent corrosion resistance even in the absence of chemical conversion treatment (Example 19).

On the other hand, the comparative examples have failed to achieve comprehensively satisfactory results for the characteristics. As in Comparative Examples 3 to 5, it has been determined that the slide angle is inferior even though the contact angle is favorable in some cases.

The invention claimed is:

1. A hydrophilic surface treatment agent for an aluminum-containing metallic heat exchanger, the agent obtained by mixing:
   a polyvinyl alcohol or a derivative thereof (A);
   colloidal silica (B);
   an organo alkoxy silane and/or a hydrolysate thereof (C);
   a cross-linking agent (D) capable of forming cross-linkage with the polyvinyl alcohol or a derivative thereof (A); and
   water (E),
   wherein the ratio {(B)+(C)}/{(A)+(B)+(C)+(D)} is 0.1 to 0.5 in terms of solid content ratio (mass ratio), the ratio (C)/(B) is 1.0 to 3.0 in terms of solid content ratio (mass ratio),
   the polyvinyl alcohol or a derivative thereof (A) is selected from the group consisting of partial saponification products or complete saponification products of polyvinyl acetate, partial saponification products or complete saponification products of copolymers of vinyl acetate with other monomer, and modified products of polyvinyl alcohol,
   the cross-linking agent (D) is different from the organo alkoxy silane and/or a hydrolysate thereof (C), and contains two or more carboxyl groups per one molecule,
   the colloidal silica (B) has an average particle size in the range of 1 nm to 100 nm, and
   the organo alkoxy silane and/or the hydrolysate thereof (C) has a glycidyl group.

2. The hydrophilic surface treatment agent according to claim 1, wherein the colloidal silica (B) has an average particle size in the range of 2 nm to 20 nm.

3. The hydrophilic surface treatment aunt according to claim 2, wherein the organo alkoxy silane (C) has a glycidyl group.

4. The hydrophilic surface treatment agent according to claim 2, wherein the hydrophilic surface treatment agent has pH of 1 to 7.

5. The hydrophilic surface treatment agent according to claim 1, wherein the hydrophilic surface treatment agent has pH of 1 to 7.

6. The hydrophilic surface treatment agent according to claim 1, wherein the polyvinyl alcohol or a derivative thereof (A) has a weight average molecular weight of 5,000 to 200,000.

7. The hydrophilic surface treatment agent according to claim 6, wherein the polyvinyl alcohol or a derivative thereof (A) has a saponification degree of 95 mol % or more.

8. The hydrophilic surface treatment agent according to claim 1, wherein the polyvinyl alcohol or a derivative thereof (A) has a saponification degree of 95 mol % or more.

9. The hydrophilic surface treatment agent according to claim 1, wherein the hydrophilic surface treatment agent contains a metal compound (F) comprising at least one metal element selected from the group consisting of V, Ti, Zr, and Cr.

10. A method for manufacturing an aluminum-containing metallic heat exchanger having a hydrophilic film on a surface thereof, the method comprising a surface treatment step of applying a surface treatment to an aluminum-containing metallic heat exchanger with the hydrophilic surface treatment agent according to claim 1.

11. The manufacturing method according to claim 10, wherein no chemical conversion treatment is carried out prior to the surface treatment step.

12. An aluminum-containing metallic heat exchanger having a hydrophilic film on a surface thereof, the exchanger subjected to a surface treatment with the hydrophilic surface treatment agent according to claim 1.

13. The hydrophilic surface treatment agent according to claim 1, wherein the cross-linking agent (D) further comprises at least one functional group selected from the group consisting of an aldehyde group, a glycidyl group, a methylol ether group, and an isocyanate group.

* * * * *